United States Patent
Ross-Messemer et al.

(10) Patent No.: US 7,384,144 B2
(45) Date of Patent: Jun. 10, 2008

(54) APPARATUS AND METHOD FOR DETERMINING CENTERING DATA FOR SPECTACLES

(75) Inventors: Martin Ross-Messemer, Essingen (DE); Matthias Kubitza, Aalen (DE); Frank Höller, Aalen (DE); Herbert Krug, Aalen (DE); Holger Wegendt, Mögglingen (DE)

(73) Assignee: Carl Zeiss Vision GmbH, Aalen (DE)

( * ) Notice: Subject to any disclaimer, the term of this patent is extended or adjusted under 35 U.S.C. 154(b) by 48 days.

(21) Appl. No.: 11/484,666

(22) Filed: Jul. 12, 2006

(65) Prior Publication Data

US 2007/0035697 A1  Feb. 15, 2007

Related U.S. Application Data

(63) Continuation of application No. PCT/EP2005/000390, filed on Jan. 14, 2005.

(30) Foreign Application Priority Data

Jan. 16, 2004  (DE) ...................... 10 2004 002 651
Sep. 15, 2004  (DE) ...................... 10 2004 045 013

(51) Int. Cl.
 *A61B 3/10* (2006.01)
 *A61B 3/14* (2006.01)
(52) U.S. Cl. .................... 351/204; 351/208; 33/200
(58) Field of Classification Search ................ 351/204, 351/206, 208; 33/200
See application file for complete search history.

(56) References Cited

U.S. PATENT DOCUMENTS

| 4,922,338 | A | 5/1990 | Arpino |
| 4,991,005 | A | 2/1991 | Smith |
| 5,129,400 | A | 7/1992 | Makino et al. |
| 6,257,721 | B1 * | 7/2001 | Hayashi et al. ............. 351/204 |
| 6,659,609 | B2 | 12/2003 | Mothes |

FOREIGN PATENT DOCUMENTS

GB  2 205 661  12/1988

OTHER PUBLICATIONS

"Convergence accommodation" by D. Kersten et al, J. Opt. Soc. Am., vol. 73, No. 3, Mar. 1983, pp. 332-338.
Zeiss brochure, "Video infral II: Centration Data of the Highest Precision for Maximum Visual Comfort".

* cited by examiner

*Primary Examiner*—William C Choi
(74) *Attorney, Agent, or Firm*—Walter Ottesen

(57) ABSTRACT

An apparatus (3) for determining centering data for eyeglasses (2) comprises a fixation device (5) and a recording unit (4) that can be triggered by a computer, records electronic images, and is disposed behind a divider element (8). The fixation device (5) produces at least one speckle pattern. The speckles can be superposed by different patterns, for example, a cross shape. The invention further relates to a method for determining centering data. The inventive method and apparatus allow to measure for test persons having the most different acuity of vision the relative centering data from a short distance while maintaining their usual posture.

24 Claims, 6 Drawing Sheets

APPARATUS AND METHOD FOR DETERMINING CENTERING DATA FOR SPECTACLES

CROSS REFERENCE TO RELATED APPLICATIONS

This application is a continuation application of international patent application PCT/EP 2005/000390, filed Jan. 14, 2005, and claiming priority from German application nos. 10 2004 002 651.3, filed Jan. 16, 2004, and 10 2004 045 013.7, filed Sep. 15, 2004, and the entire content of these applications is incorporated herein by reference.

FIELD OF THE INVENTION

The invention relates to an apparatus for determining centering or centration data for spectacles having a recording unit which is mounted behind a divider element and has a fixating device. The recording unit records electronic images and is driveable by a computer. The invention also relates to a method for determining centering data for spectacles.

BACKGROUND OF THE INVENTION

Apparatus for fitting spectacles serve to precisely determine the optical centering for spectacle frames already fitted anatomically. The vertical distance of the center point from the zero viewthrough point is dependent, inter alia, upon the inclination of the frame. The zero viewthrough point is that point in the plane of the frame through which the fixation line of the eye passes at the zero view direction. This vertical distance is necessary for the satisfaction of the rotation point requirement of the eye. Accordingly, spectacles fitting apparatus operate either at a constant forward inclination angle or they permit the measurement of the forward inclination angle for a natural head posture and body posture.

The vertical and horizontal centering data of the spectacles ($X_R$, $X_L$, $Y_R$, $Y_L$) need to be measured during the optical spectacle lens centering. From the Zeiss brochure 20-759-e it is known to do this with a video device in front of which the test person assumes a position at a distance of approximately 5 m. The centering data are then determined based on the video images. With this procedure, a correspondingly large space must be made available.

The optimal correction has as a condition precedent that the seating of the frame (anatomical fitting of spectacles) is taken into account in the fitting of the spectacles. The device "Video Infral" of Carl Zeiss AG detects the seating of the frame in three dimensions so that the previously determined correction values can be realized in the optimal spectacle lens. These correction values include, for example, spectacle lens diameter, weight of the spectacle lens, minimal peripheral thickness, minimal center thickness. Front and lateral recordings are made simultaneously by two video cameras and are digitalized and stored in the connected computer. In the digital images, the following can be marked: the position of the pupils, the position of the corneal vertex distance and the position of the characteristic contours of the frame. From these marks, the computer determines the optimal parameters of a spectacle lens for correct viewing by a spectacles wearer. The term "corneal vertex distance" is generally understood to be the distance between the image end vertex point of the spectacle lens and the cornea.

A video advisory system is disclosed in U.S. Pat. Nos. 4,922,338 and 4,991,005 and has a recording unit which records electronic images and is driven by a computer. A video advisory system of this kind serves to provide customer advice in optometry shops with the selection of a new spectacles frame.

Furthermore, a video device "Visu-Point" of Ulev GmbH is known wherein a test person fixates on an object at only a short distance (for example, at only 1 meter). This fixing object can, for example, be an LED mounted above a video camera. The video camera takes images of the test person while the test person views the fixing object. It is disadvantageous here that the convergence position of the pair of eyes is approximated via the purely geometric convergence. The convergence of the pair of eyes arises with the fixation.

U.S. Pat. No. 5,129,400 discloses an arrangement for investigating the tissue of the ocular fundus. A laser beam is used and a speckle is intended to be generated by the ocular fundus.

SUMMARY OF THE INVENTION

It is an object of the invention to provide an improved apparatus for determining centering data for spectacles which permit to measure the relative centering data $X_R$, $X_L$, $Y_R$, $Y_L$ for test persons of different visual acuity in the habitual posture, that is, in the posture of the test person in the relaxed state, for example, when standing or sitting with this measurement being made from a short distance. The centering data is indicated by $X_R$, $X_L$, $Y_R$, $Y_L$ wherein, according to the boxing system, $X_R$=centering point coordinate right horizontal; $X_L$=centering point coordinate left horizontal; $Y_R$=centering point coordinate right vertical; and, $Y_L$=centering point coordinate left vertical.

The above object of the invention is achieved with the apparatus of the invention. The apparatus of the invention is for determining centering data for spectacles. The apparatus includes: a divider element; a recording unit for recording electronic images and the recording unit being mounted behind the divider element; a computer for driving the recording unit; and, a fixation device for generating at least one speckle pattern.

The above object is also achieved with the method of the invention. The method of the invention is for determining the centering data for spectacles wherein a speckle pattern is generated as a fusion stimulus for a customer to be examined; an image recording is made at least of the eye region of the customer with the spectacles mounted; and, the centering data for the spectacles are determined based on this image recording in accordance with mathematical methods.

The customer, in general, wears a spectacles frame (that is, a frame without spectacle lenses) for determining the centering data. In the case of rimless frames, one can operate with support plano glasses which do not negatively influence the measurements.

The convergence comprises a motoric component and a sensoric component of the pair of eyes. The motoric component is the convergence component effected by muscle movement and the sensoric component is the convergence component effected by the interconnection of nerve cells. The totality of the occurrences is characterized as fusion and the occurrences lead to simple binocular viewing and maintain this because of the fusion stimuli emanating from the objects. These occurrences are substantially subconscious. The motoric fusion and sensoric fusion interact with each other. With the aid of the eye movement muscles, fusion effects a vergency in order to direct the eyes as accurately as possible on the fusion object. Sensoric fusion effects binocular viewing of one image with the aid of switching operations in the nervous system even with slight disparity, that is, when the two monocular images do not lie precisely on the corresponding retina locations with these two monocular images belonging together.

The actual convergence position of the eyes of a test person is therefore not necessarily the same as that resulting from the position of the fixating object. As a rule, the motoric convergence is less than necessary according to geometric viewing. With the sensoric convergence, the test person tries to compensate this difference. In this way, greater scattering and errors of the centering data occur inexorably depending upon the motoric or sensoric component of the convergence of the test person.

With the apparatus of the invention, the fixing of the optical centering can take place for a spectacles frame which has already been fitted anatomically. The vertical distance of the center point from the zero through-viewing point is taken in accordance with the forward inclination of the frame. This vertical distance of the center point is necessary for satisfying the requirement of the center of rotation of the eye. The forward inclination angle and the lateral head inclination can be determined for the natural head posture and body posture. Furthermore, the distance of the pupils of a test person can be determined. The apparatus can, in addition, be provided with a device for determining the corneal vertex distance. This device measures the distance of the frame edge or spectacle glass edge from the forward surface of the cornea. The distance of the frame edge is perpendicular to the frame plane. The vertex depth of the curved spectacle glass has to be added to this measured value.

The optimal correction has as a condition precedent that the seating of the frame is considered in the fitting of the spectacles. For this purpose, photographs of a customer are taken from the front and the side and, based on these photographs, the positions of the pupils, the corneal vertex distance and the frame are determined. For this purpose, a measuring bracket is mounted on the spectacles frame carried by the test person. This measuring bracket can, for example, have target markings which make possible a determination of the relevant angles and values in accordance with the parallax principle. Relevant angles and values are, for example, the forward inclination, the tilting of the head to the side, the head rotation to the side and the corneal vertex distance.

The mutual distance of the centering points $P_R$ and $P_L$ for the two spectacle lenses in a spectacles frame is known as the center point distance Z and is the sum of the right and left monocular center point distance ($Z = Z_R + Z_L$) This distance corresponds to the mutual distance of the through-viewing points in the correction spectacles and is equal to the center distance in non-prismatic spectacle lenses. According to German industrial standard 13666 (DIN 13666), the center distance is the horizontal distance between the optical center points of the spectacle lenses in a pair of spectacles (when all prescribed prisms have been neutralized); in progressive spectacle lenses, this distance is the distance between the fitting points. For fixing the two center points, their coordinates x and y can be used. Here, in the horizontal, the following applies: $Z_R + Z_L = X_R + X_L + d$, wherein d is the distance between spectacle lenses.

The speckle pattern has the characteristic for the test person to appear always as a sharp fixation pattern independently of the ametropia of the test person. This applies not only for myopic eyes (short sightedness) but also for hyperopic eyes (far sightedness). Speckles are interference phenomena which occur in space. The ametropic eye sees the speckles in the spatial plane which corresponds to the test person's distance refraction point plane. Accordingly, it is very simple to direct the attention of a test person to such a pattern and to maintain the test person's attention during the video recording.

With the apparatus of the invention, it is furthermore made possible to measure the centering data of a test person close up, that is, from a distance of less than 2 m and preferably less than 1.5 m. The fixating object is, however, imaged at infinity, at least, however, at a distance of at least 5 m, and there appears to the test person.

A marking for the test person can be projected onto the floor for the correct positioning of the test person.

With the invention, it can be achieved that the eyes of a test person do not converge during the determination of the centering data, that is, that the fixating lines of both eyes do not move inwardly.

In the apparatus of the invention, it can be provided that the fixating device is configured as a fixating device generating at least one specific speckle pattern. The user of the apparatus of the invention can use specific speckle patterns for specific test persons, for example, test persons which are very short sighted, with these speckle patterns having been shown to be very suitable for this type of customer. The speckle pattern can, for example, be annularly-shaped, circularly-shaped, shaped in the form of crosses or stars. Also, a combination of this speckle pattern can be used. Accordingly, speckles can be generated on which a specific form, for example, a cross is superposed as a common outer form so that a specific speckle pattern is provided, for example, a cross-shaped speckle pattern.

In the apparatus of the invention, it can be provided that the recording unit is configured as a video camera or a photo camera.

The fixating device can include a light source which throws a coherent light beam via a diffusion element onto the divider element as a speckle pattern. The light source can include a laser emitter. Preferably, the laser emitter is a laser diode or an He-Ne laser. The divider element can be configured as a partially transmissive mirror, a plane-parallel plate or a beam splitter cube. The light source therefore emits a coherent light beam and this light beam can already have a specific pattern, for example, a cross generated by a diffractive optical element. The light beam impinges upon the diffusion element and is cast from there as a speckle pattern onto the divider element.

The apparatus of the invention can be provided with a moveable diffusion element and especially with a diffusion element that can be rotated. Motion can be imparted to the diffusion element by means of a motor. The diffusion element can, for example, rotate at 0.5 to 5 rpm preferably, 1 to 2 rpm. A minimum rotational speed is necessary in order to trigger the physiological stimuli of a movement for the test person.

Furthermore, in a preferred embodiment of the apparatus of the invention, it can be provided that the speckle pattern is imaged at infinity at least, however, at a distance greater than 5 m. The speckle pattern can be imaged via a collimator optic at infinity at least, however, at a distance greater than 5 m. The collimator optic is mounted between the diffusion element and the divider element.

The collimator optic can be realized by conventional spherical lens surfaces. In order to keep the influence of the spherical aberration low, the focal width of the lens should be selected correspondingly large, for example, f'=800 to 1200 mm, preferably f'=1000 mm, so that the aperture ratio is tolerable. The collimator optic can be configured with aspheric lens surfaces, especially with aspherical Fresnel lens surfaces. In this way, the correction of the spherical aberration can also take place even when using smaller lens focal lengths such as f'=300 mm. With the use of aspherical Fresnel lenses, the mechanical complexity is clearly reduced for the lens holder. With the use of spherical Fresnel lens profiles, a focal length of at least 500 mm should be used.

The output aperture of the apparatus should be adapted to the sum of eye distance and pupil diameter of as large a number of test persons as possible and therefore be at least 60 mm, preferably more than 90 mm. The output aperture is given by the optic projecting to infinity. For an adequately large output aperture, both eyes of a test person can detect the speckle pattern.

In a preferred embodiment of the apparatus of the invention, it can be provided that a deflecting mirror be mounted between the diffusion element and the divider element and preferably between the diffusion element and the collimator optic. With a folding of the optical assembly (that is, with a beam deflection), the structural size of the apparatus can be significantly reduced.

The recording unit is advantageously equipped with an automatic focus so that the recorded images are always sharp. Additionally, the ZOOM (image section) in the camera can be advantageously controlled by the PC used.

If the image recording unit is too high or too low for the particular person, then the image recording unit can be moved upwardly or downwardly. The image recording unit can also be selectively tilted. The tilt angle, which is needed to compensate for body size, can be considered when computing the forward inclination or the centering values.

Furthermore, the fixating unit can advantageously include at least one diffractive optical element or a wavefront modulator, that is, a spatial light modulator. Variable diffractive optical elements can be generated with the spatial light modulator. Spatial light modulators can be used in reflective configurations as well as in transmissive configurations. Selectively, several diffractive optical elements can be used sequentially or together. The spatial light modulator or diffractive optical element can be configured to generate, for example, a cross-shaped or annularly-shaped pattern or a combination of a cross-shaped and annularly-shaped pattern.

Advantageously, a flash device assigned to the recording unit can be connected to a light conductor. Preferably, the light conductor is a light conductor leading in the direction of the patient to be measured.

The speckle patterns are generated on the diffusion element by means of a laser and diffractive optical element and/or spatial light modulator. These speckle patterns can be perceived by patients of different visual acuity as sharp patterns. Repeatable speckle patterns of specific configuration can be generated because specific diffractive optical elements and/or spatial light modulators, diffusion elements and laser are used.

Finally, it can be provided that the diffusion element is configured as a diffusion disc or diffusion cylinder. Also, other geometrical shapes for the diffusion element are possible. The diffusion element can also be configured as a diffusion plate which can be displaced laterally back and forth or as a diffusion curtain similar to a continuous belt. The diffusion elements can be made of plastic, glass, metal or other suitable materials. The diffusion surfaces can, for example, be sandblasted. The average roughness is preferably between 5 and 50 μrms.

The method of the invention is carried out utilizing the apparatus according to the invention.

With the method and apparatus of the invention, it is made possible for test persons of different visual acuity to measure their relative centering data in their habitual posture at a short distance.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
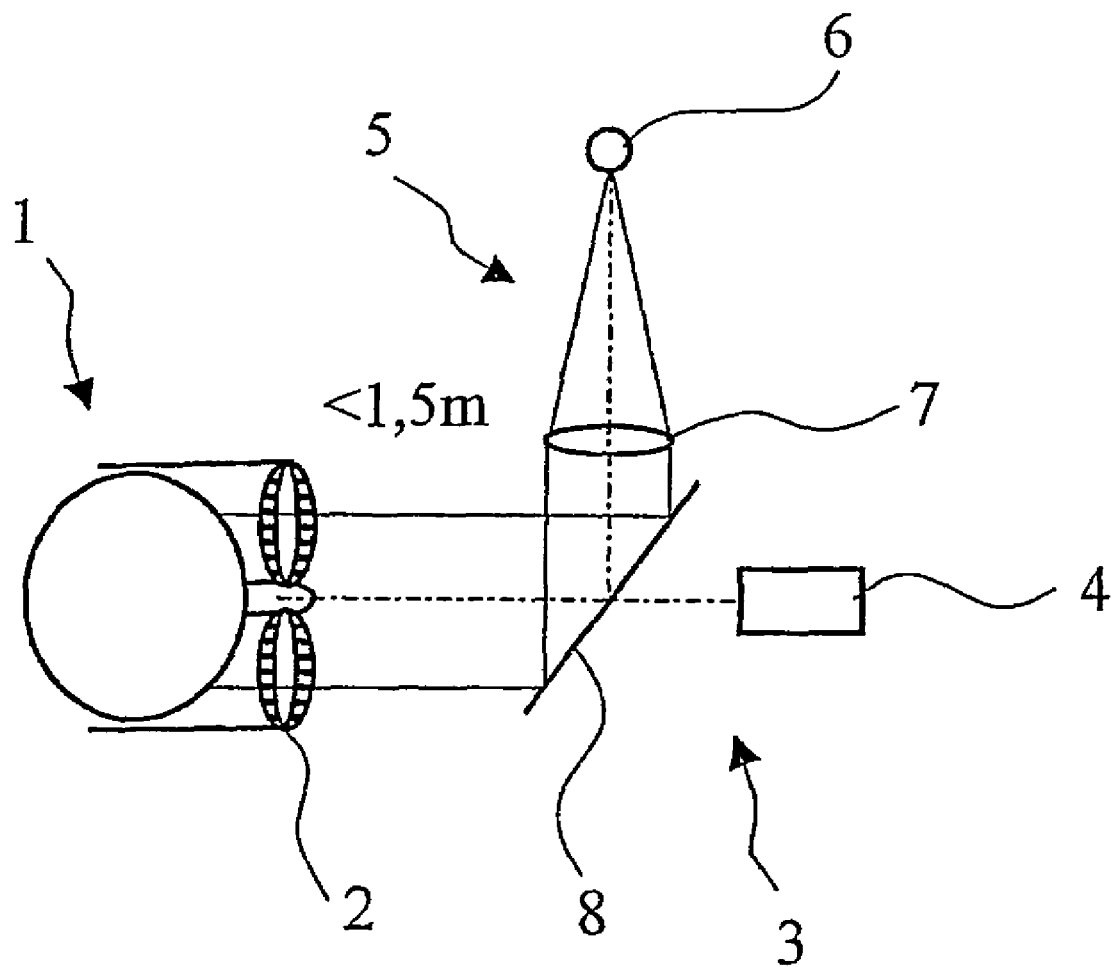
FIG. 1 is a schematic of an apparatus for determining the centering data of a pair of spectacles with a fixating target.

FIG. 1 shows schematically the head 1 of a test person wearing a frame 2 of a pair of spectacles. The test person looks into an embodiment of the apparatus 3 of the invention at a distance of less than 1.5 m (for example, 0.5 m) to determine the centering data of the test person. The apparatus 3 is likewise shown schematically and includes a recording unit in the form of a video device 4 and a fixating device 5. The fixating device 5 includes a fixating target 6 as well as a collimator optic 7 and a divider element 8. The fixating target 6 generates a speckle pattern in that coherent light is directed onto a diffusion element (not shown), for example, a diffusion disc of defined roughness. The divider element 8 is configured as a partially-transmitting mirror. The collimating optic 7 can include one or several lenses.

Figure 2:
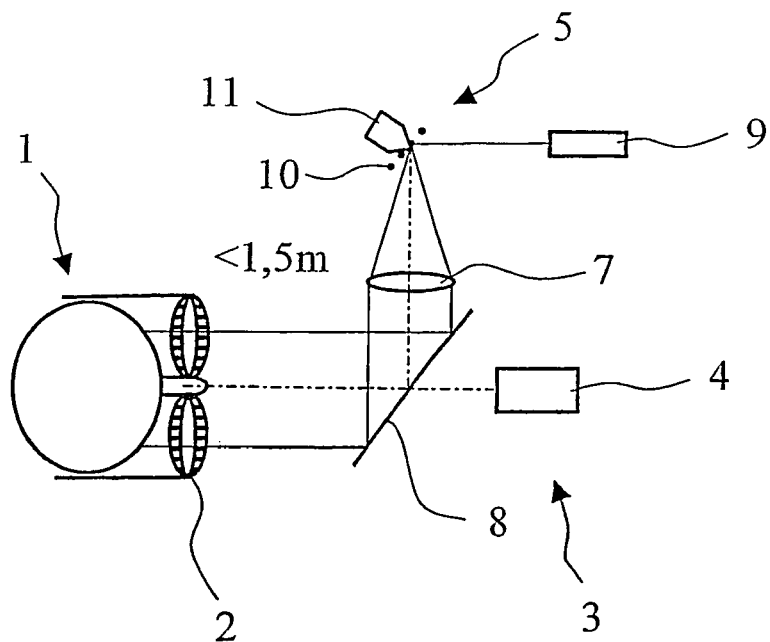
FIG. 2 is an apparatus for determining the centering data of a pair of spectacles with a rotatable diffusion disc and a collimator optic.

In FIG. 2, a laser emitter 9 is provided in lieu of the fixating target 6. The laser emitter 9 casts a light beam onto a diffusion element in the form of a diffusion disc 10. The divider element 8 is configured as a plate-shaped partially-transmitting mirror. The divider element 8 makes possible the precise superposition of the optical rays of the fixation beam path and of the viewing beam path. To determine the fixating data, the test person looks in a direction of the video unit 4. The laser emitter 9 generates a laser beam which is scattered at the diffusion disc 10 and thereby generates speckle patterns so that especially even very ametropic persons look in the correct direction. The speckle patterns are guided into the field of view of the test person via a collimator optic 7 and via the divider element 8 mounted forward of the video unit 4. The diffusion disc 10 can selectively be equipped with a motor 11 which rotates the diffusion disc 10 or otherwise moves the same. Depending upon the ametropia of the test person, a resulting speed of the individual speckles adjusts. Because the speckles always appear sharp, even very ametropic test persons can fixate on the speckle patterns and thereby assume the correct position for the video recording.

Figure 3:
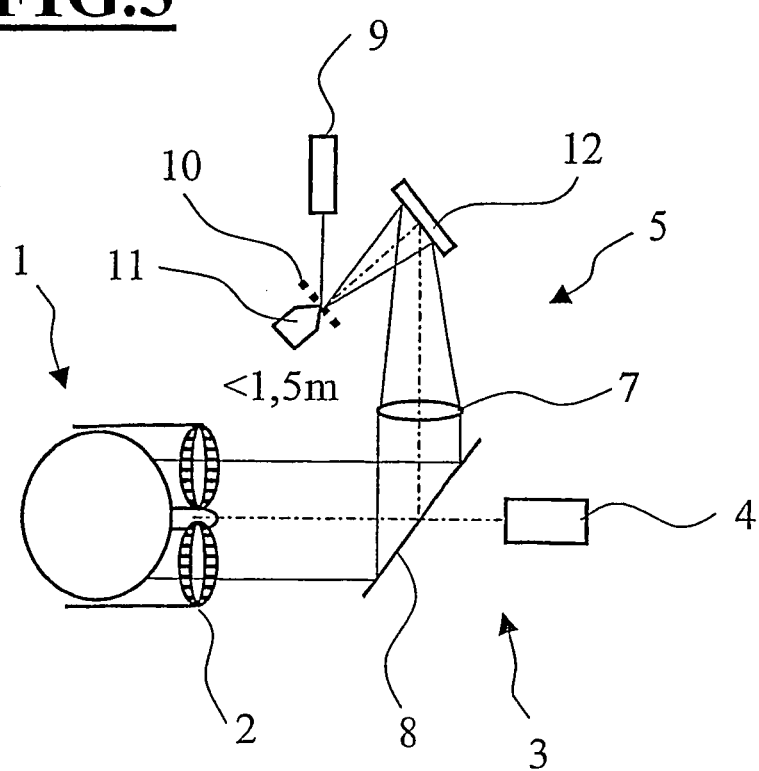
FIG. 3 is an apparatus for determining the centering data of a pair of spectacles of FIG. 2 with an additional deflecting mirror.

In FIG. 3, the apparatus of FIG. 2 is expanded with a deflecting mirror 12. The light, which is emitted from the laser onto the diffusion disc 10, impinges first on a deflecting mirror 12 and only thereafter on the collimator optic 7. With the beam deflection, the structural size of the apparatus can be significantly reduced. In this way, it is made possible to set up such an apparatus also in small rooms.

Figure 4:
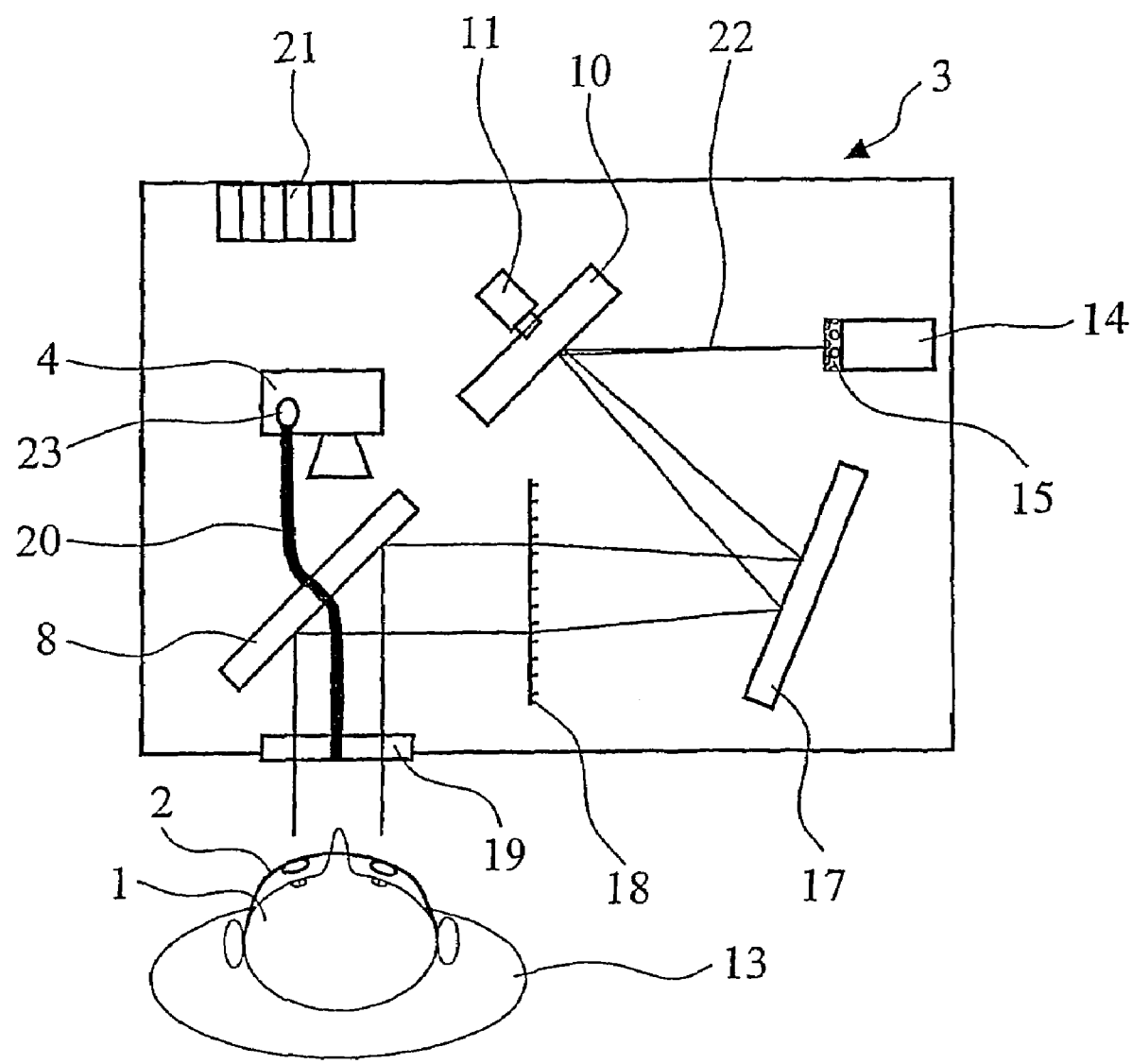
FIG. 4 is an apparatus for determining the centering data with a diffusion disc and a diffractive optical element.
Figure 5:
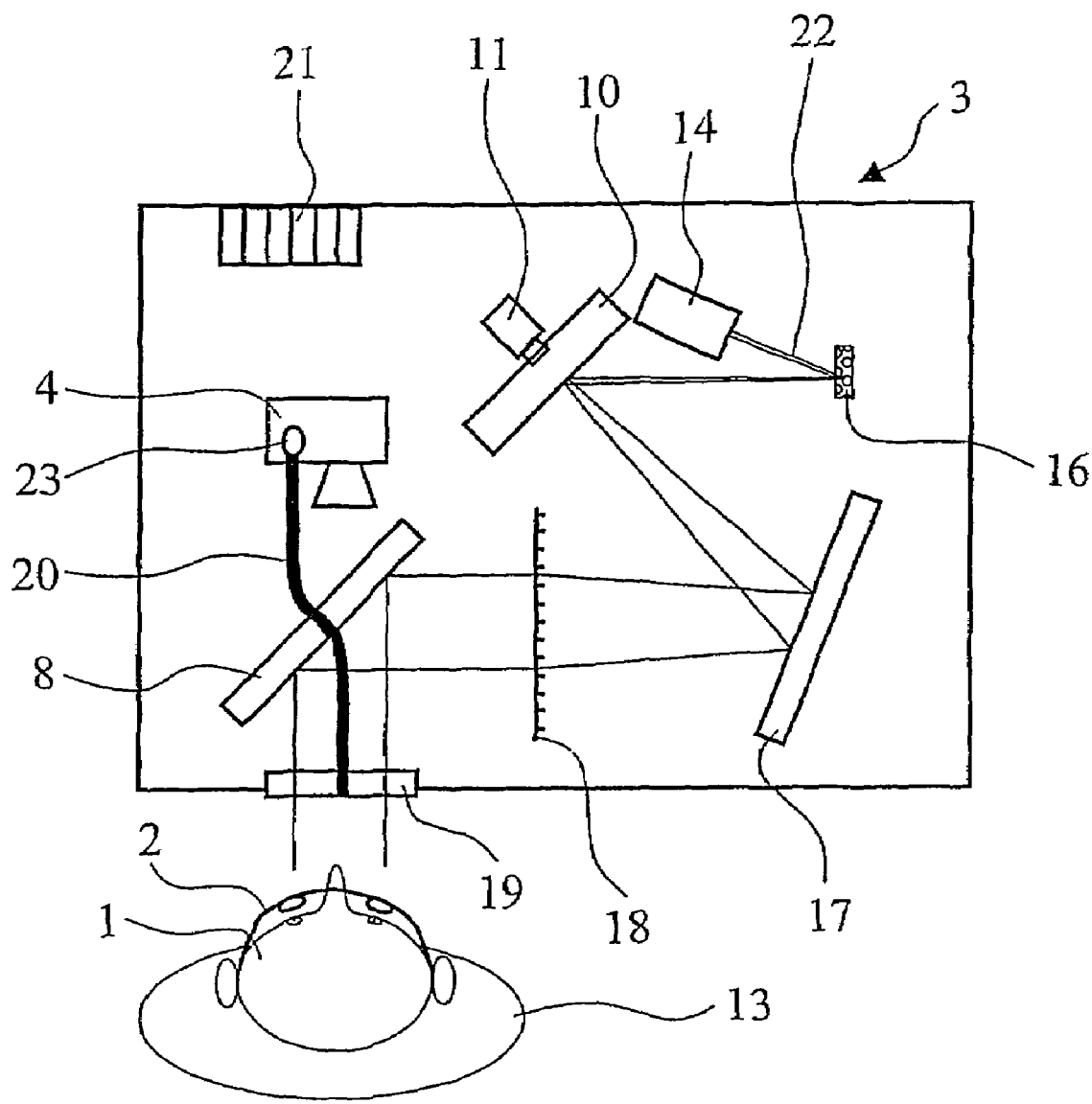
FIG. 5 is an apparatus for determining the centering data with a diffusion disc and a spatial light modulator.
Figure 6:
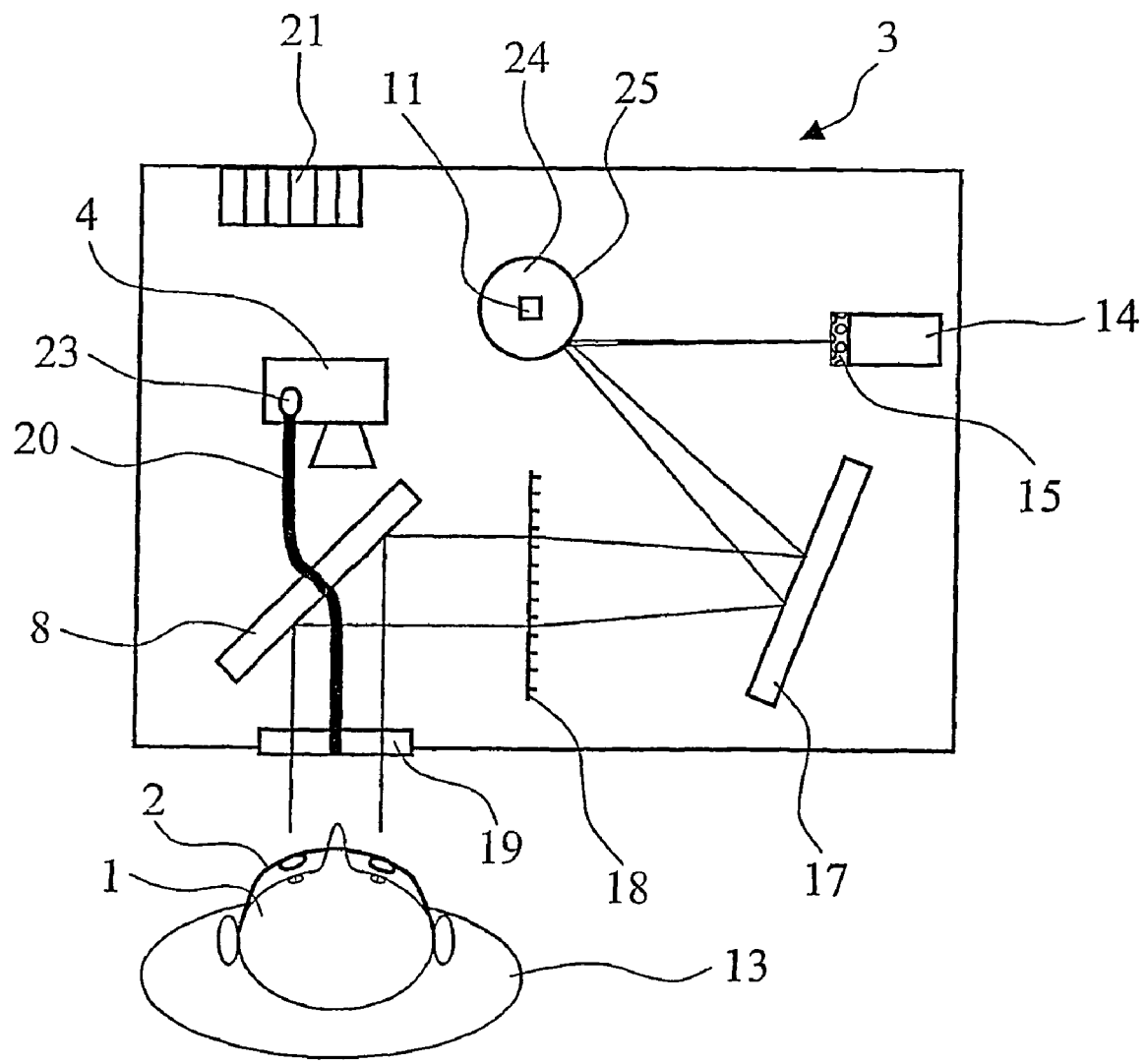
FIG. 6 is an apparatus for determining the centering data with a diffusion cylinder and a diffractive optical element.

FIGS. 4, 5 and 6 schematically show embodiments of the apparatus of the invention to give an especially good fusional stimulus to the person to be measured (such as a patient of the optometrist).

In FIG. 4, the apparatus 3 of the invention includes a laser diode 14 which can be controlled with respect to power and which preferably emits a narrow band between 610 and 680 nm.

A diffractive optical element 15 is mounted forward of the laser diode 14. The diffractive optical element 15 can so modify a laser beam 22 of the laser diode 14 that the time-dependent coherence is maintained and that a wanted fusion-capable pattern occurs on a diffusion disc 10 which causes a fusional stimulus in the test person. The fusion-capable pattern can, for example, be a cross-shaped speckle pattern.

Not every modulated angular spectrum, which is projected onto the diffusion disc, triggers an adequate fusional stimulus in the patient to be examined. A circularly-shaped angular spectrum, which is projected onto the diffusion disc, effects only a weak fusional stimulus; whereas, a circularly-shaped or elliptical ring or a cross or a multi-pointed star or superpositions of these figures can trigger a clear fusional stimulus in the patient.

Diffractive optical elements are shown in FIGS. 4 and 6 and a spatial light modulator is shown in FIG. 5. The angular spectrum, which is projected by the diffractive optical element or spatial light modulator, is preferably so configured that it is perceived only in the region of the sharpest viewing, that is, preferably an angular spectrum of a maximum of 5°. In the center of the fovea, which is characterized by 0°, the relative visual acuity is the greatest. In this way, preferably, the cones in the eye of the patient are excited and the rods are protected.

The diffusion element (for example, the diffusion disc 10) is so configured that this element preferably makes available a continuum of spatial frequencies. Preferably, diffusion angles of 0.05 to 5° are generated. The diffusion element can be rotated by means of a motor 11, for example, at 0.5 to 5 rpm, preferably 1 to 2 rpm.

The laser beam is cast upon a divider element 8 via a mirror 17 and a lens 18 (preferably a Fresnel lens) and passes through a protective element 19 onto the eyes of the patient 13 who is wearing a spectacles frame 2. The protective element preferably has the form of a protective disc and is preferably made of glass. The image end focal plane of the Fresnel lens 18 lies in the plane of the diffusion disc 10.

The patient 13 wearing a pair of spectacles is encouraged to look directly into the apparatus 3 because of the speckle pattern so generated by the laser beam and to naturally fuse the images viewed. In this way, the determination of the patient data takes place rapidly and correctly. With a recording unit 4, for example, a video unit or a photographic camera, the face of the patient 13 (or at least the eye region of the patient 13 including the spectacles) is recorded.

A flash 23 is mounted on the video unit 4 and is connected to a light conductor 20. This light conductor 20 runs from the flash unit 23 to the protective disc 19 and thereby makes possible an improved use of the flash light.

The apparatus 3 of the invention includes an integrated control and evaluation unit 21. This unit can also include the voltage supplies for the internal current consumers.

The laser beam can generate a speckle pattern by means of the diffractive optical element 15 and the diffusion disc 10. The speckle pattern, for example, has a cross-shaped outer outline.

Because of the pattern written with the aid of the diffractive optical element 15 on the diffusion disc 10, a speckle pattern is generated by the diffusion disc so that a clear fusional stimulus is caused. The form of the patterns written on the diffusion disc 10 and the speckle pattern generated in this manner are decisive for the intensity of the fusion stimulus. A simple fusion stimulus can be achieved in that a point-shaped pattern having a gaussian-like profile is generated on the diffusion disc. For an intense fusion stimulus, a cross-shaped, ring-shaped pattern or a combination of both patterns is suitable. An angular region of maximally 5° is made available to the eyes to be examined. The center of the fovea is identified by 0°, the location of the highest relative visual acuity.

In FIG. 5, a wavefront modulator (that is, a spatial light modulator 16) is provided. This spatial light modulator 16 can generate variable diffractive optical elements 15. Spatial light modulators 16 can be used in a reflective configuration as well as in a transmittive configuration. A reflective spatial light modulator 16 is shown in FIG. 5. In FIG. 4, the simple diffractive optical element 15 can also be replaced by a transmissive spatial light modulator 16.

With a spatial light modulator 16, the most different speckle patterns can be generated in that differently formed diffractive optical elements 15 are generated with the spatial light modulator 16 in a wanted speed and sequence. In this way, differently defined patterns (for example, a cross) can be generated with the laser beam which are projected onto the diffusion disc 10 where, with the aid of the diffusion disc 10, speckle patterns are generated. In this way, the pupil distances of a larger number of patients can be measured. Up to now, patients with larger prismatic defects could not be measured with the usual simple point-shaped patterns. A suitable fusional stimulus is made available also for these patients with the spatial patterns.

If different patterns are to be generated and if there is no spatial light modulator 16 available, then selectively, several diffractive optical elements 15 can be utilized which generate different patterns. The diffractive optical elements can be moved sequentially via a slider into the beam path.

With the apparatus of the invention, the beam profile, which is modified by the diffractive optical element 15, can be completely detected by both eyes of the patient whose eyes are to be measured and who wears a spectacles frame.

In FIG. 6, the apparatus 3 of the invention includes a diffusion cylinder 24 which is provided in lieu of the diffusion disc. The diffusion cylinder 24 is configured as a rotating drum having a diffusion surface 25. The diffusion cylinder can be built in perpendicularly or horizontally and preferably at approximately 45°±5° relative to the axis which is defined by the eyes of a patient. The diffusion cylinder can be driven by a motor 11. The motor can, for example, be seated on the axis of the drum or be mounted in the region of the axis. The pattern triggering the fusional stimulus is then projected, for example, at approximately 45° to the drum axis or parallel to the drum axis. With the cross-shaped speckle pattern to be generated, a half axis of the cross is imaged preferably parallel to the drum axis.

Figure 7:
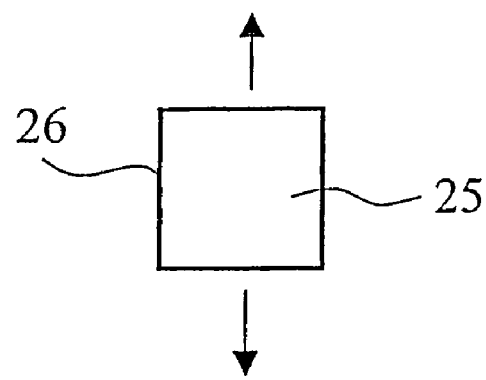
FIG. 7 is a schematic of a diffusion plate.

FIG. 7 shows a diffusion plate 26 having a diffusion surface 25. The diffusion plate 26 can be made of glass or plastic. The diffusion plate 26 can be configured to be displaceable laterally back and forth. This is indicated by two arrows.

Figure 8:
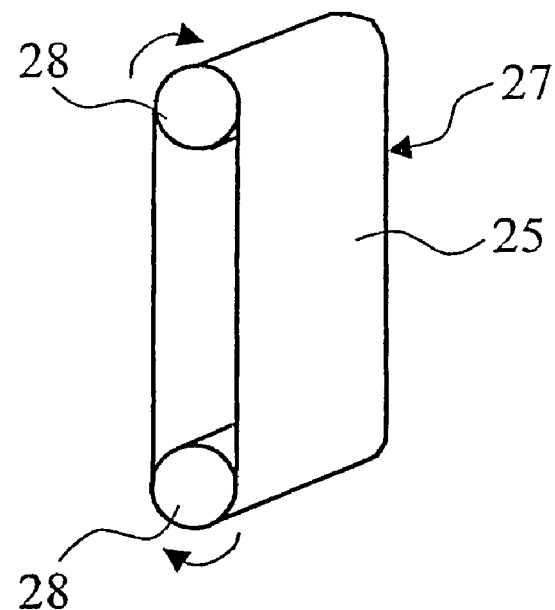
FIG. 8 is a diffusion curtain.

FIG. 8 shows a diffusion curtain 27 having a diffusion surface 25. The diffusion curtain 27 can, for example, be manufactured of metal. The diffusion curtain 27 is rotatably mounted via two rotation drums 28. The rotational direction provided in this example is indicated by arrows.

Figure 9:
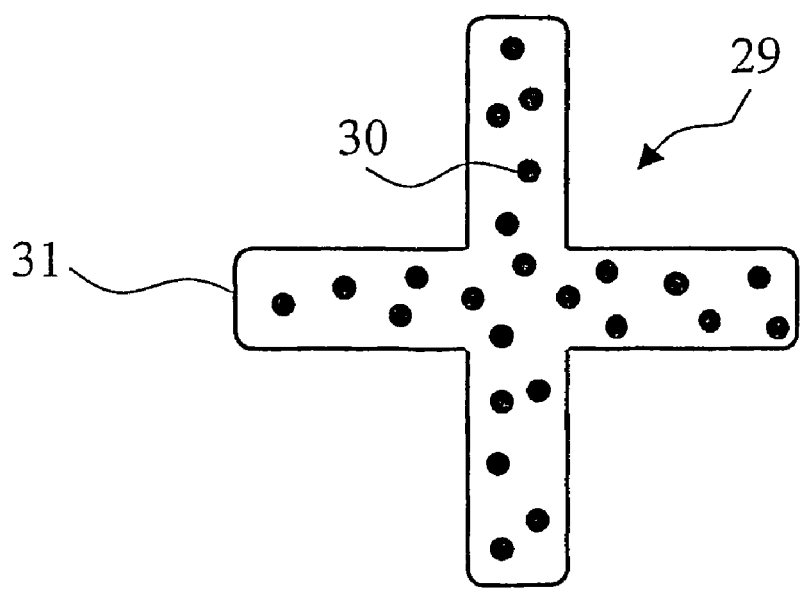
FIG. 9 is a cross-shaped speckle pattern.

FIG. 9 shows a sketch of a cross-shaped speckle pattern 29. By way of example, some speckles 30 are shown with a superposed cross-shaped pattern 31. The cross shape is shown with a black contour for this schematic to facilitate recognizability.

It is understood that the foregoing description is that of the preferred embodiments of the invention and that various changes and modifications may be made thereto without departing from the spirit and scope of the invention as defined in the appended claims.

What is claimed is:

1. An apparatus for determining centering data for spectacles, the apparatus comprising:
   a divider element;
   a recording unit for recording electronic images and said recording unit being mounted behind said divider element;
   a computer for driving said recording unit; and,
   a fixation device for generating at least one speckle pattern.

2. The apparatus of claim 1, wherein said fixation device generates a specific speckle pattern including an annularly-shaped, cross-shaped or star-shaped speckle pattern.

3. The apparatus of claim 1, wherein said recording unit is configured as a video camera or camera.

4. The apparatus of claim 1, wherein said fixation device includes:
   a light source for transmitting light along a beam path;
   a diffusion element being disposed in said beam path;
   said divider element being disposed in said beam path downstream of said diffusion element so as to permit said light source to cast a coherent light beam via said diffusion element onto said divider element as a speckle pattern.

5. The apparatus of claim 4, wherein said light source includes a laser emitter in the form of a laser diode or an He—Ne laser.

6. The apparatus of claim 4, wherein said diffusion element is mounted to be moveable.

7. The apparatus of claim 6, said fixation device including a motor for moving said diffusion element.

8. The apparatus of claim 4, wherein said diffusion element is mounted to be rotatable.

9. The apparatus of claim 4, wherein said fixation device includes a collimator optic mounted in said beam path between said diffusion element and said divider element; and, said speckle pattern is imaged at infinity (at least, however, at a distance greater than 5 m) via said collimator optic.

10. The apparatus of claim 9, wherein said collimator optic is configured with aspheric lens surfaces.

11. The apparatus of claim 9, wherein said collimator optic is configured with aspheric Fresnel lens surfaces.

12. The apparatus of claim 9 further comprising a deflection mirror mounted between said diffusion element and said collimator optic.

13. The apparatus of claim 4, further comprising a deflection mirror mounted between said diffusion element and said divider element.

14. The apparatus of claim 13, wherein said fixation device futher includes at least one diffractive optical element for generating at least one speckle pattern.

15. The apparatus of claim 14, wherein said diffractive optical element is configured to generate a cross-shaped or annularly-shaped pattern or a combination of a cross-shaped and annularly-shaped pattern.

16. The apparatus of claim 13, wherein said fixation device further includes at least one spaitial light modulator for generating a speckle pattern.

17. The apparatus of claim 16, wherein said spatial light modulator is configured to generate a cross-shaped or annularly-shaped pattern or a combination of a cross-shaped and annularly-shaped pattern.

18. The apparatus of claim 13, wherein siad fixation device includes at least one spatial light modulator for generating any desired number of speckle patterns.

19. The apparatus of claim 4, wherein said diffusion element is configured as a diffusion disc, diffusion cylinder, diffusion plate or diffusion curtain.

20. The apparatus of claim 1, wherein said divider element is configured as a partially transmissive mirror or a beam splitter cube.

21. The apparatus of claim 1, wherein said speckle pattern is imaged at infinity, at least, however, at a distance greater than 5 m.

22. The apparatus of claim 1, further comprising a flash unit assigned to said recorder unit; a light conductor connected to said recorder unit; and, said light conductor being a light conductor leading in a direction of the customer to be measured.

23. A method for determining centering data for spectacles, the method comprising the steps of:
   generating a speckle pattern as a fusion stimulus for a customer to be examined;
   making an image recording at least of the eye region of the customer wearing the spectacles; and,
   based on said image recording, determining the centering data for the spectacles in accordance with mathematical methods.

24. The method of claim 23, wherein said method is carried out using an apparatus for determining centering data for spectacles, the apparatus including:
   a divider element;
   a recording unit for recording electronic images and said recording unit being mounted behind said divider element;
   a computer for driving said recording unit; and,
   a fixation device for generating at least one speckle pattern.

* * * * *

UNITED STATES PATENT AND TRADEMARK OFFICE
CERTIFICATE OF CORRECTION

PATENT NO. : 7,384,144 B2
APPLICATION NO. : 11/484666
DATED : June 10, 2008
INVENTOR(S) : Martin Ross-Messemer et al.

It is certified that error appears in the above-identified patent and that said Letters Patent is hereby corrected as shown below:

Column 3:
Line 49: delete "(Z = $Z_R+Z_L$)" and substitute -- (Z = $Z_R+Z_L$). -- therefor.

Column 9:
Line 37: delete "being disposed" and substitute -- mounted -- therefor.

Column 10:
Line 1: delete "9" and substitute -- 9, -- therefor.
Line 16: delete "spaitial" and substitute -- spatial -- therefor.
Line 22: delete "siad" and substitute -- said -- therefor.

Signed and Sealed this

Twenty-sixth Day of August, 2008

JON W. DUDAS
*Director of the United States Patent and Trademark Office*